US008558558B2

United States Patent
Richter (10) Patent No.: US 8,558,558 B2
(45) Date of Patent: Oct. 15, 2013

(54) METHOD AND MONITORING SYSTEM FOR CLOSING COVERS

(75) Inventor: Wolfgang Richter, Starnberg (DE)

(73) Assignee: Ident Technology AG, Wessling (DE)

( * ) Notice: Subject to any disclaimer, the term of this patent is extended or adjusted under 35 U.S.C. 154(b) by 824 days.

(21) Appl. No.: 12/160,815

(22) PCT Filed: Jan. 12, 2007

(86) PCT No.: PCT/DE2007/000033
§ 371 (c)(1),
(2), (4) Date: Sep. 14, 2010

(87) PCT Pub. No.: WO2007/079728
PCT Pub. Date: Jul. 19, 2007

(65) Prior Publication Data
US 2011/0012621 A1    Jan. 20, 2011

(30) Foreign Application Priority Data
Jan. 12, 2006    (DE) .......................... 10 2006 001 666

(51) Int. Cl.
*G01R 27/26* (2006.01)
(52) U.S. Cl.
USPC ........... 324/675; 324/679; 324/658; 324/686; 340/426.1
(58) Field of Classification Search
USPC .................................. 324/679, 675, 658, 686
See application file for complete search history.

(56) References Cited

U.S. PATENT DOCUMENTS

| 5,166,679 | A | * | 11/1992 | Vranish et al. ............ 340/870.37 |
| 6,205,710 | B1 |  | 3/2001 | Busse ................................. 49/27 |
| 2002/0080014 | A1 | * | 6/2002 | McCarthy et al. ............ 340/426 |
| 2002/0154039 | A1 | * | 10/2002 | Lambert et al. ................. 341/33 |
| 2005/0046584 | A1 | * | 3/2005 | Breed ........................ 340/825.72 |
| 2005/0179445 | A1 | * | 8/2005 | Nakano et al. ................ 324/661 |
| 2006/0254142 | A1 |  | 11/2006 | Das .................................. 49/26 |

* cited by examiner

*Primary Examiner* — Arleen M Vazquez
*Assistant Examiner* — Son Le
(74) *Attorney, Agent, or Firm* — King & Spalding L.L.P.

(57) ABSTRACT

The invention relates to a method and a monitoring system for automatically actuated, in particular power-driven closing covers, for example boot lids of motor vehicles. The invention also relates to a method and a detection system for detecting the presence of objects per se. The aim of the invention is to provide solutions for the implementation of a reliable safety system. According to the invention, this is achieved by a detection system comprising a modulation unit for generating an alternating voltage, which is applied between a first output and a second output on the modulation device, a field generation structure that is coupled to one of the outputs in order to generate an extensive excitation field and a detection device comprising a detection electrode structure for detecting a field-electric effect in a detection area that extends along the electrode structure, the field generation structure and the detection electrode structure being located in the vicinity of one another and the detection electrode structure and the field generation structure being shielded from one another, in such a way that when the excitation field and the detection area are bridged by an object to be detected, a voltage event that can be classified as indicating a presence is induced in the detection electrode structure.

17 Claims, 10 Drawing Sheets

Sensor element

Cross-section through the sensor element

METHOD AND MONITORING SYSTEM FOR CLOSING COVERS

CROSS REFERENCE TO RELATED APPLICATIONS

This application is the U.S. national phase of PCT application PCT/DE2007/000033, filed 12 Jan. 2007, published 19 Jul. 2007 as WO 2007/079728, and claiming the priority of German patent application 102006001666.1 itself filed 12 Jan. 2006, whose entire disclosures are herewith incorporated by reference.

The invention relates to method and control system for automatically actuated, in particular, powered closing hatches, for example, trunk lids of motor vehicles. In addition, the invention also relates to a method and detection system for detecting the presence of an object per se.

Competition within the automotive business is forcing manufacturers to provide more convenience for their customers. This includes, among other things, a feature whereby vehicle hatchbacks and trunk lids can be opened automatically at the touch of a button, these operations being typically powered (electrically, pneumatically, hydraulically, or by a spring system).

Since the forces associated with opening or closing hatchbacks or trunk lids are not insignificant, people must be protected from getting pinched, while objects must be protected from being damaged. Sensors are provided to assist in clearly differentiating between a safe and an unsafe state, then initiating appropriate actions, such as, e.g. stopping or reversing a moving part of the vehicle. Heretofore this has been accomplished by touch-sensitive seal strips, the activation of which closes an electrical contact. Due to the mass inertia of the closing or opening hatches, these approaches can achieve only a limited increase in safety since they work only once a person's limb or an object is engaged. As a result, a desire for systems has arisen that preclude injury to persons in advance.

The fundamental problem of the invention is to provide solutions by which a reliable safety system can be realized.

According to the invention, this problem is solved by a detection system comprising:

a modulator for generating an alternating voltage that as such is applied between a first output and a second output of the modulator;

a field-forming structure that is coupled to one of the outputs for the purpose of generating a spatially extended excitation field following the field-forming structure; and a detector comprising a detection electrode structure to detect a field-electric effect within a detection area extending along the detection electrode structure;

wherein the field-forming structure and the detection electrode structure are provided near each other, and the detection electrode structure and the field-forming structure are shielded from each other such that when the excitation field and the detection area are bridged by an object to be detected, a voltage event that can be classified as indicating a presence is induced in the detection electrode structure.

This advantageously enables the approach of human limbs to a hazard-relevant motion-path area of an object, in particular, trunk lids, to be detected, and the motion of the object to be influenced so as to prevent a collision between the limbs and the object.

In an especially preferred embodiment of the invention, the field-forming electrode structure and detection electrode structure are provided in the closing gap area of a trunk lid. It is possible here to integrate the field-forming structure and the detection electrode structure in a hatch seal.

The field-forming electrode structure and detection electrode structure can be fabricated out of a conductive synthetic material. This synthetic material can be a component of the seal. It is possible to fabricate the seal as an extruded profile with integrated electrode zones.

It is possible to couple the modulator to the shielding structure such that a voltage is able to be applied that is modulated in terms of the phase position and voltage distance relative to the detection electrode structure and/or the field-forming structure. This enables the spatial shape of the detection area and/or of the excitation field to be formed over the distance of the voltages applied to these electrode systems, in particular, to vary this shape in terms of its orientation.

An especially favorable shape of the field spaces is achieved by associating multiple shield electrodes with the detection electrode structure and/or the field-forming electrode structure, and by varying the shape and/or the orientation of the excitation or detection area by matching the distances of the voltages to the respective shield electrodes.

Based on the concept according to the invention, what is created in particular is a trunk lid assembly for a motor vehicle comprising a trunk lid movable within a trunk-lid frame, a movement mechanism to guide the trunk lid in that trunk-lid track region, and a detection system of the above-mentioned type, wherein when the presence of an object is detected by the detection system and classified as hazard-relevant, the movement mechanism is placed in an operational state in which the risk of injury from the motion of the trunk lid is prevented or reduced.

The invention furthermore relates to a method of detecting the approach of vital objects to moved components in which continuously, or at sufficiently small intervals, a proximity state characterized by an approach of the vital object to the moved component is detected based on field-electrical interaction effects, wherein the dynamic response of the change in the proximity state is determined based on sequentially detected proximity states, and the proximity state is classified based on a correlation of that of the dynamic response of the proximity state change with a reference dynamic response characterized by the motion of the moved component.

The classification can be effected with the purpose of determining whether, and optionally in what form, a dangerous condition is present. The classification can indicate whether an object is approaching or an object is moving away. A safety action sequence can be calibrated based on the dynamic response of the object approach. For example, it is possible to reduce the operating speed of an actuation, e.g. the closing speed of a hatch, and to activate a motor current limitation when an approach is detected.

The dynamic response of the actuation can be determined by a wide variety of effects corresponding to the actuation. It is also possible to provide measuring systems, e.g. pulse generators, rotary transducers, or linear measuring systems by which the actual of the moved component can be detected. A change in the sensor signal is detected as being significant that occurs with a dynamic response that is not caused exclusively by the inherent dynamic of the moved component.

It is also possible to implement the signal evaluation according to the invention as part of a detection concept that takes into account additional detection criteria in an appropriate system. Aside from the above-reference dynamic criterion, it is also possible here in particular to evaluate the measurement signals obtained in terms of the proximity state per se.

In a hatchback protection system, what is possible in particular is to implement multiple detection zones and to classify asymmetries between the results of the individual detection zones in terms of dynamic response or intensity as cutoff-relevant results, and to generate corresponding output signals based thereon. The detection of asymmetries can be effected by coupling symmetrically changing sensor systems during the motion sequence in such a way that during controlled operation a cancellation results, and an appropriate signal output is effected only in response to asymmetrical detection results.

Preferably, the reference dynamic is used to compensate nonlinear relationships in the change of the sensor signals and in the motion of the moved components.

It is also possible to use the reference dynamic to compensate those changes allowable in the sensor signals caused by interaction with stationary adjacent systems.

The system furthermore relates to detecting the approach of vital objects toward moved components that are movable as such within a control range, comprising:

an electrode, an LC network connected to the electrode, a reference system correlating relationships between the capacitance of the electrode and different system control states, a controller for influencing the LC network as a function of the reference system such that energization of the electrode is adequately matched to the instantaneous system control state, and an evaluation circuit for evaluating the operation of the LC network and for generating an evaluation result based thereon.

The evaluation circuit can be equipped with a mixer that mixes the frequency applied to the LC network with the frequency of the mixing oscillator.

The mixed frequency can be varied as a function of the dynamic response of the moved components. The evaluation circuit can be designed such that the circuit extracts signals that are not triggered as such by the system control state after admixture of the mixed frequency.

It is possible to connect the sensitive oscillator directly (e.g. direct connection to the metal object) or indirectly (via a conducting object) to the movable object. The oscillator is preferably designed so that it can be matched over a wide range to the object or to a wide variety of objects, thereby enabling a high dynamic range to be achieved and actuation-related changes in the object to be compensated.

Based on one particular aspect of the invention, it is possible to construct and configure the circuit system so as to be able to switch between two detection methods (PLL method and frequency analysis method). This aspect provides fast compensation for the motion of the object and continuous detectability of unusual events (e.g. approach of a person).

THE SOLUTION ACCORDING TO THE INVENTION

A redundantly operating sensor system using the capacitive/resistive principle provides reliable control over the closing and opening actions of tailgates, rear-opening hatches, trunk lids, automatically-opening doors, etc. Here both the closing edges and other hazardous regions of a trunk, as well as the moved vehicle component (lid) have alternating fields applied to them. The frequency and level change of these fields is analyzed in relation to a closing and opening action, obstructions to the operations can be determined and result in the motion being halted or reversed. In the case of an open hatchback, an approaching person can be alerted in a timely fashion so as to prevent head injuries, e.g. hitting his/her head. The closing action can be initiated by a predeterminable gesture, thereby eliminating the need for closing switches, which aspect results in a cost benefit for the constructive design. At the same time, the invention utilizes methods for frequency changing and level measurement. The purpose of this last aspect is to prevent an automatically opening hatchback from striking another vehicle or garage roof. Alternatively, it is also possible to utilize ultrasound, infrared or other phase-measurement methods, etc. for this purpose.

Additional details and features of the invention are revealed in the following description in combination with the drawing. Therein.

Figure 1A:
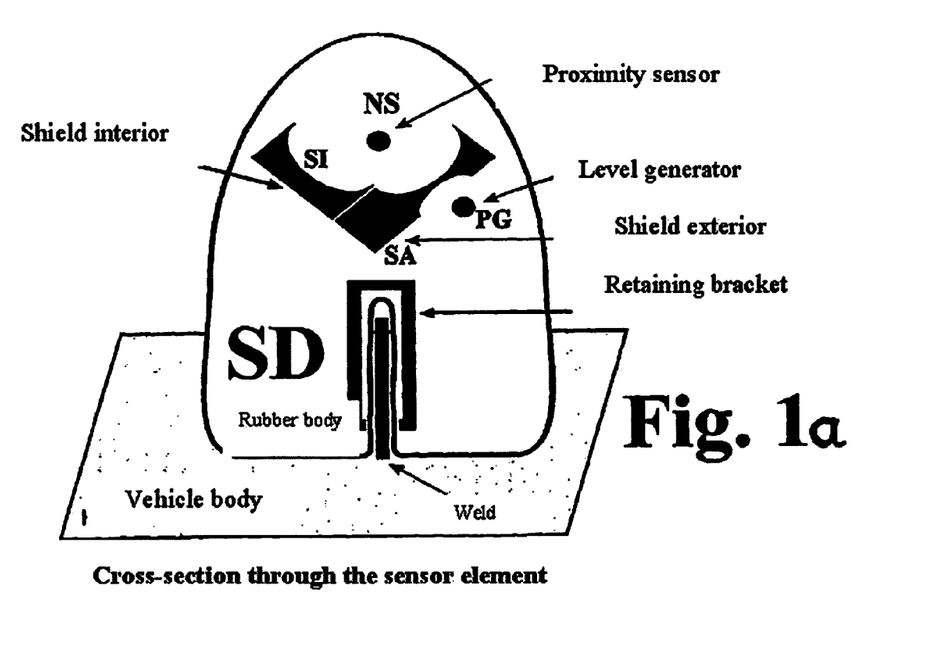
FIGS. 1a and 1b show a first embodiment of a detection electrode according to the invention in cross-section.
Figure 1B:
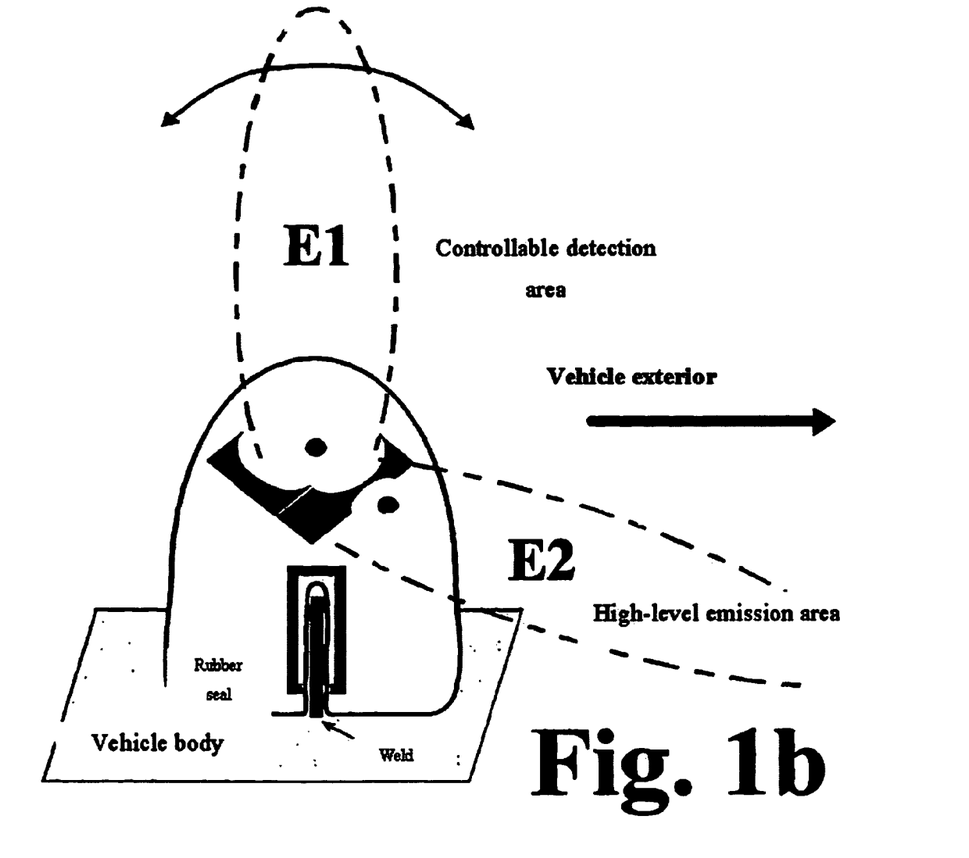

FIGS. 1a and 1b illustrate a first embodiment of the invention. The closing edge seal SD of a rear-opening hatch is designed here such that various zones of different conductivity are set in the seal over its entire length. Nonconductive material here surrounds zones that are always conductive. A certain electrical resistance RM of the material is advantageous. Various conductive and nonconductive rubber mixtures and/or plastics can be used for this purpose that can be permanently attached to each other. If no sealing function is desired, it can also be omitted.

The outer conducting zone is located at the center of SD and forms the actual proximity sensor NS. Surrounding the sensor are zones insulated by a dielectric nonconductive material (dielectric) that are provided as directional shields SI and SA. As is clear from FIG. 1, these are cupped around the actual sensor element NS. Located facing the outside is a so-called signal-level emitter element PG that allows electrical alternating fields to be emitted away from the vehicle into the environment or to ground (EG).

FIG. 1b shows the characteristic shape of the alternating fields, where by varying the shield level (Shield) using P1 it is possible to direct the approach area (detection area) toward the cover closing edge. E2 is emitted outward (away from the vehicle) at an increased level by means of SA.

Figures 2A, 2B:
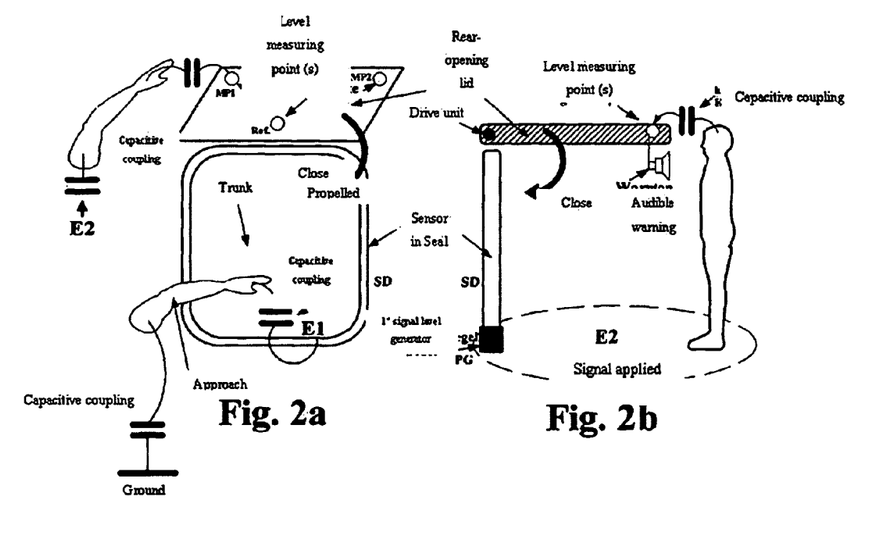
FIGS. 2a and 2b show another arrangement where the sensor element SD extends annularly around the closing edges of the hatchback of a motor vehicle.

FIG. 2a shows another arrangement where the sensor element SD extends annularly around the closing edges of a motor vehicle (rear-opening area). A first simple oscillator OszSens (see FIG. 7) generates a frequency of, for example, 200 kHz. It is attached at multiple points to the sensor device—specifically in such a way that the inner sensor element NS can react to capacitive changes (E1), while the outer emitter element PG can output the frequency signal at an increased level (E2). Since the sensor element is composed of conductive rubber or polymer, it has a certain resistance. This is expedient and advantageous in order to filter out harmonics created by the generator and so as to ensure EMC-compliant operation. In addition, the resistive material allows for additional inventive advantages, such as, for example, determining the position of intruding limbs, etc. As human limbs approach the sensor element SD, these introduce an additional capacitance through NS, thereby causing the frequency of the first oscillator to drop accordingly. An approach toward NS can be detected, e.g. from a distance of 20 cm.

Sensor points MP1, MP2, and Ref are located in the rear-opening hatch (FIG. 2a) that are fed to a level-measuring device. This device is able to measure the signal level of the emitted frequency and relay it to an evaluation unit. In addition, these measuring points are able to detect additional levels that are introduced, e.g. by the limbs of approaching persons and to differentiate these from the intrinsic motion activity since the level is raised to an excessive degree and verifiably in response to the approach of the limbs. For this purpose, it is necessary to have the signal level applied to a approaching person. This is one of the functions of the emitter element PG that with the aid of shield electrode SA emits an electrical alternating field outward toward the given person (FIG. 2b). It is possible to set up a level-measuring point in the rear-opening hatch as a reference point (Ref) in order to ensure that a signal level is in fact detected and that the sensor operates correctly. It is also possible to determine the position of the hatchback by this reference point, so that this position must at any instant match a predetermined level value.

Figure 3:
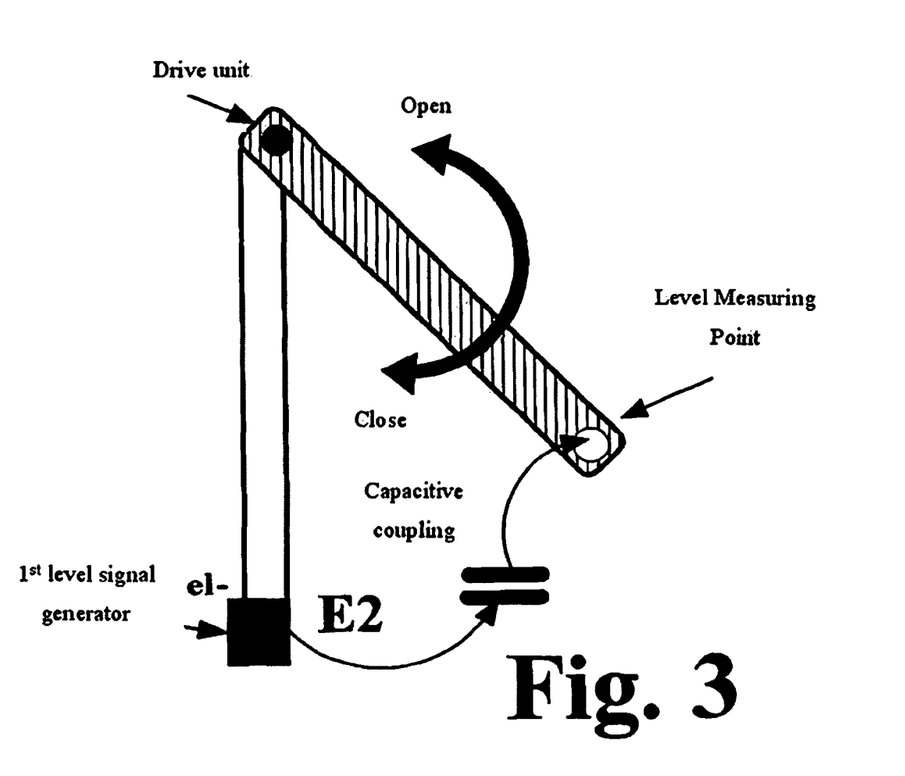
FIG. 3 is a schematic view illustrating additional details of the invention.

As is evident in FIG. 3, the measuring points must be set such that a uniform change in level occurs at all points when the hatchback closes or opens appropriately.

If a conductive object, e.g. a person, is at one location, the person picks up the frequency level E2 emitted by the closing edge seal and relays this level (among other things) to the nearest measuring point, thereby resulting in an increased level at this location (see FIG. 2b). This is detected and the hatchback is halted, or the closing or opening action can be reversed. Since there is an increased risk of jamming something when the rear-opening hatch approaches a closing edge (and thus the sensor seal according to the invention), this is where the redundant operation of the invention is effective since when limbs are inserted over NS a frequency change, and through the measuring points in the rear-opening hatch, a level/ratio change become measurable. Actuation-related changes in capacitance can be compensated by the similarly actuation-related level changes.

Figure 4:
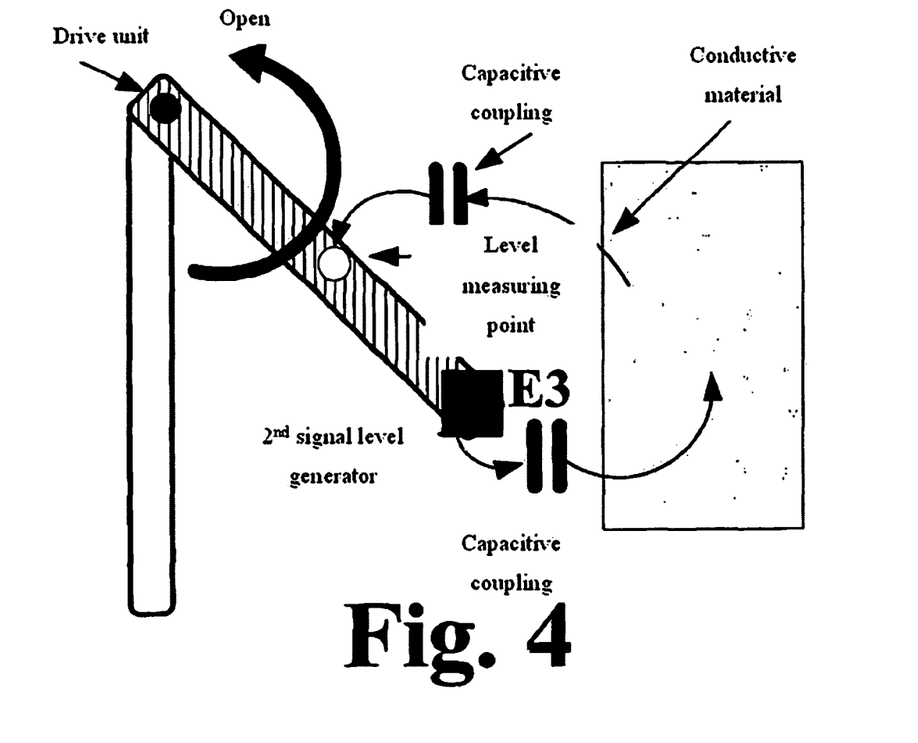
FIG. 4 is also a schematic view illustrating additional details of the invention.
Figure 5:
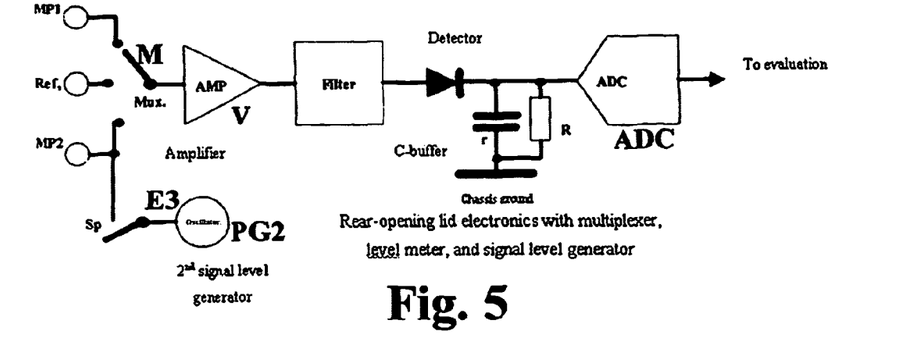
FIG. 5 is a schematic view illustrating a circuit arrangement comprising a multiplexer.

If a vehicle equipped according to the invention is located in the vicinity of another vehicle, a determination can be made during the opening action as to whether level E2 is being picked up from this action and relayed to the hatchback (FIG. 4). This then prevents the hatchback from possibly hitting the vehicle. It can also be utilized when the hatchback is opened to its greatest extent and there is a risk of hitting the garage wall or ceiling. For this purpose, a conductive strip (aluminum foil, etc.) must be attached at the hazard site so as to create a so-called level bridge. When the hatch is opened, the radiated energy is emitted from a point on the wall or garage ceiling. If the hatchback now approaches the foil strip, the level is generated in amplified form at both points. A method is also possible whereby, e.g. one of the relevant sensor points (e.g. MP2) briefly has a signal E3 applied to it by a generator PG2 and thereby itself becomes the emitting point, while the other sensor point MP1 is used as the opposing point for the level measurement. The level will not change in response to a motion in a normal dielectric. In response to an approach to a metal surface (or to a person), a capacitive bridge circuit is closed. The level increases at the measuring point, thereby resulting in a cutoff (or reversal of the hatchback). FIG. 5 show a corresponding block diagram for the electronics.

Response in the Case of Nonconductive Objects in the Closing Area

Figure 6:
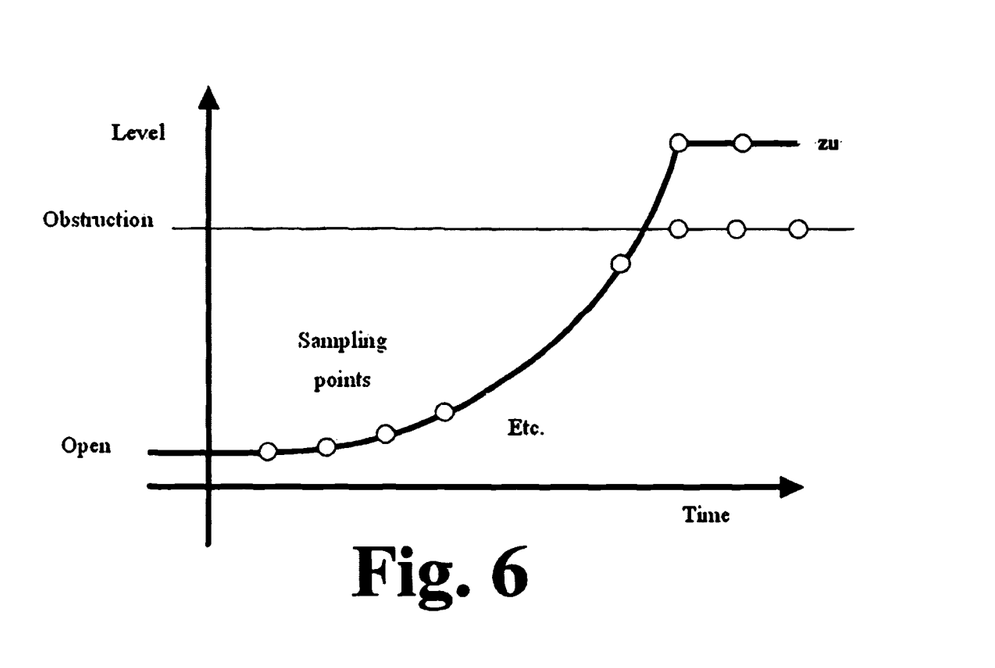
FIG. 6 is a schematic view illustrating a signal level curve.

It is also possible for objects to move into the area of the closing edges or of the opening radius that are nonconductive and thus cannot produce any capacitance change or level change. This is where the reference point Ref installed in the hatch is of special significance. It allows a change in the level to be detected at any time during the motion. If no change is detectable, this confirms that motion is no longer occurring, and that the hatchback or trunk lid has been stopped in some way by a nonconductive object (jamming situation). In order to preclude weather-related level changes, the multiple sensor points installed on the hatchback can also alternately serve as a reference relative to each other, thereby forming a ratio that supplies a single weather-independent value for every position of the opening or closing hatch. If no change is detectable between two successive level measurements, then the hatch has been stopped by a mechanical cause. This can also occur if the closing action was completed appropriately, or the opening action has reached its end position and the hatch cannot move any further (FIG. 6). This is advantageous if these points in an evaluation device result in the drive unit of hatchback being switched off. Limit switches are thus unnecessary. Elements obstructing the closing or opening action result in the hatch no longer being able to move—a condition that normally would cause the motor to stall, due to its gearing ratio, which can damage or destroy objects. The purpose of the reference level is to prevent this, which reference level then no longer shows any change, a reliable indication that a nonconductive object has been jammed. A conductive object is recognized as such in advance, with the result that no jamming is possible in this case. This is true in particular for human limbs.

The emission of sensor level E2 from generator PG can also proceed through an electrode EG to ground (earth=ground). In a manner analogous to a lightning strike, a funnel voltage is generated in the ground that an approaching person picks up by his/her feet and can pass on through the limbs or head per se to the moving hatchback. Whenever it is detected there, this is a reliable verification that the person is in a hazardous situation. The lid can be stopped or reversed. It is possible to alert the person in advance by means of an acoustic signal. This is useful whenever the person, e.g. puts objects in the vehicle that block his/her view and there is a risk that the person can strike his/her head against the hatchback, a situation that can be prevented by an audible warning. This audible warning can also inform a driver that, e.g. a child (e.g. unnoticed by the driver) is located in front of the hatchback. In order to be able to correctly identify a level signal, it is also possible to modulate this with data or frequencies. This seems a useful step in order to counteract disturbing interference.

Circuit Design Example

Figure 7:
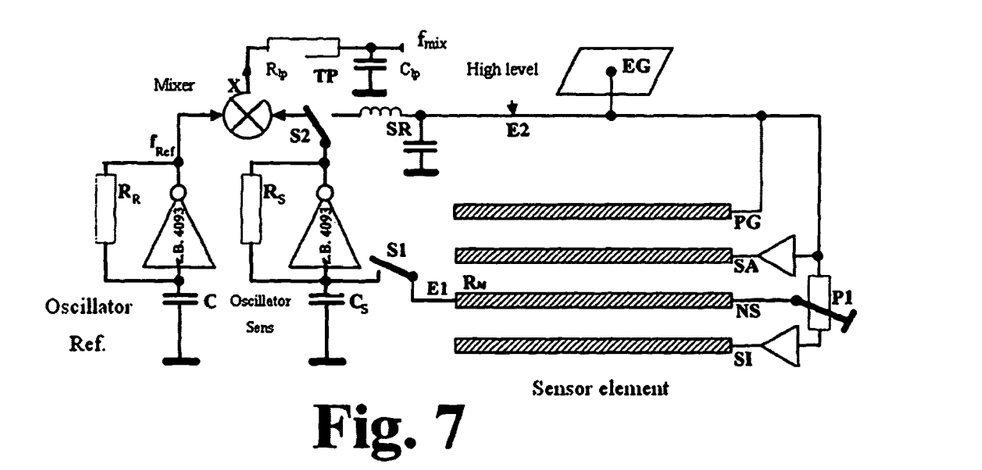
FIG. 7 is another schematic view illustrating a circuit arrangement according to the invention.

FIG. 7 shows a circuit that is essentially composed of an oscillator OszSens that has been created from an inverter (Schmitt trigger) (RC oscillator). With the aid of resistor RS, the capacitor CS here forms the fundamental frequency. This circuit is connected through an electronic switch S1 to the sensor element NS of the closing edge seal (E1). At the same time, adjustable shield buffers (SI, SA) are connected to the two shields. The adjustment is effected, for example, by a digital potentiometer (P1). The output of oscillator OszSens is connected through the switch S2 on one side to a mixer stage (X) and on the other side to a level-raising device, e.g. a series resonance circuit SR, the output (E2) of which is routed to the external-emission device PG of the sensor element. A reference oscillator OszRef forms another part of the sensor device. Its output is also connected to mixer stage X (e.g.

XOR). Connected to the output of this stage is a low-pass filter TF that can output only the absolute value of the mixed frequency from both oscillators.

When both oscillators have the same setting, the mixed frequency is zero. When limbs are inserted, the frequency of OszSens is reduced by the additional capacitance, with the result the mixed frequency after TP rises in a manner corresponding to the change value.

The signal from the low-pass filter can be fed through a comparator or Schmitt trigger to an evaluation unit (e.g. microprocessor). This unit is also capable of generating its own reference frequencies through digital-to-analog converters or digital signals, and internal oscillators (e.g. PWM), or to vary the frequencies of other oscillators (VCO principle). This is useful for implementing an automatic balancing (zero-balancing). To this end, the resistors (RS) of the sensor oscillator OszSens and of the mixing reference oscillator OszRef (RR) must be electrically adjustable. Potentiometers or semiconductor materials are appropriate for this purpose, the resistance of which can be modified, e.g. by voltage/current, light, or magnetism. In addition, sensor points are installed in the movable hatchback (FIG. 2a) (MP1, Ref, MP2, etc.) that can pick up a signal, as multiplexed (M) by a sequencer, multiplexer, or microprocessor, and relay it to an amplifier V (see FIG. 5). There they are boosted and the level is detected, its value measured, then fed through an ADC to the evaluation device (e.g. microprocessor). A dedicated program there can determine whether the level change corresponds to a closing or opening action. This is the case whenever it has the same values at least at the two outer points (MP1, MP2); the ratio is then 1.

If levels E2 or E3 are introduced by conductive objects or persons in the vicinity of a measuring point, then a difference can be detected (ratio<>1). In response, the hatch drive motor can be stopped or reversed. It is therefore expedient to use the same controller as well to control the motor (electric motor, compressor, etc.) required for moving the hatches/covers. In addition, it is possible to attach at least one button to the input of the controller that enables opening and closing. A (e.g. serial) data feed enables a radio-data receiver (e.g. Bluetooth, WLAN, etc.) or remote-control receiver to be interfaced, thereby allowing, e.g. a hatchback to be opened and closed by remote control from a distance (e.g. by a cell phone, radio-controlled key, etc.).

Possible Design Examples of the Invention

The applied signal level can also be measured in absolute form and compared with a stored characteristic.

Figure 8:
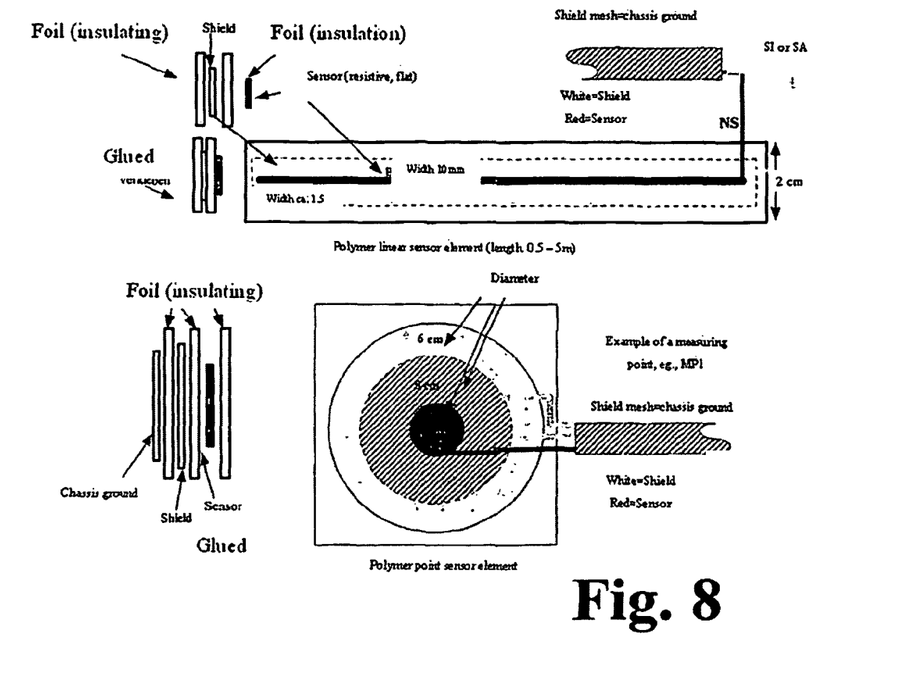
FIG. 8 is a schematic view illustrating another circuit arrangement according to the invention.

The invention can also be used as to supplement conventional touch-sensitive or other anti-jamming protection devices, or to replace these entirely. To this end, e.g. at least one multilayer adhesive strip (e.g. polymer) and/or multilayer, partially resistive paint application can be deposited, the layers of which, when appropriately arranged, form sensor element SD according to the invention (FIG. 8). Carbon fibers are also appropriate as a sensor element. The conductive and nonconductive layers can be arranged as in FIG. 1 or similar manner.

A thin metal foil (e.g. copper) can be used, e.g. as the emitter electrode to ground EG.

It is also possible to use a predeterminable area of an opened hatchback as a "virtual close command" whenever a signal level (in relation to the other measuring points) introduced at this location by human limbs is detected. A sticker with the label "Close here", etc., can be applied here. When a hand is moved into the immediate vicinity thereof, this can be detected according to the invention and the closing action then initiated.

The detection direction of NS can be advantageously modified by controlling the shields (SI and SA) as governed by how the hazardous situation changes during the closing action.

A generator can be used to apply a level (similar to E3) to heating or ventilation shafts, e.g. in underground garages, routed along ceilings to prevent hatchbacks from hitting them and causing damage.

A foil to which a signal is applied can protect transported dogs (e.g.) in the trunk (or loading area) from injury when the hatches are closing and the animal tries to escape.

Since the resistive material RM is used that corresponds to an increasingly higher resistance along its shape, this can, e.g. functioning as a voltage divider, advantageously emit a higher signal level at certain definable locations in comparison with others. This is true in particular as well for emitter element E2. The voltage drop to be detected can also provide information about the hatchback position during closing and opening actions, and can be exploited for the redundant operation of the invention.

Figure 9:
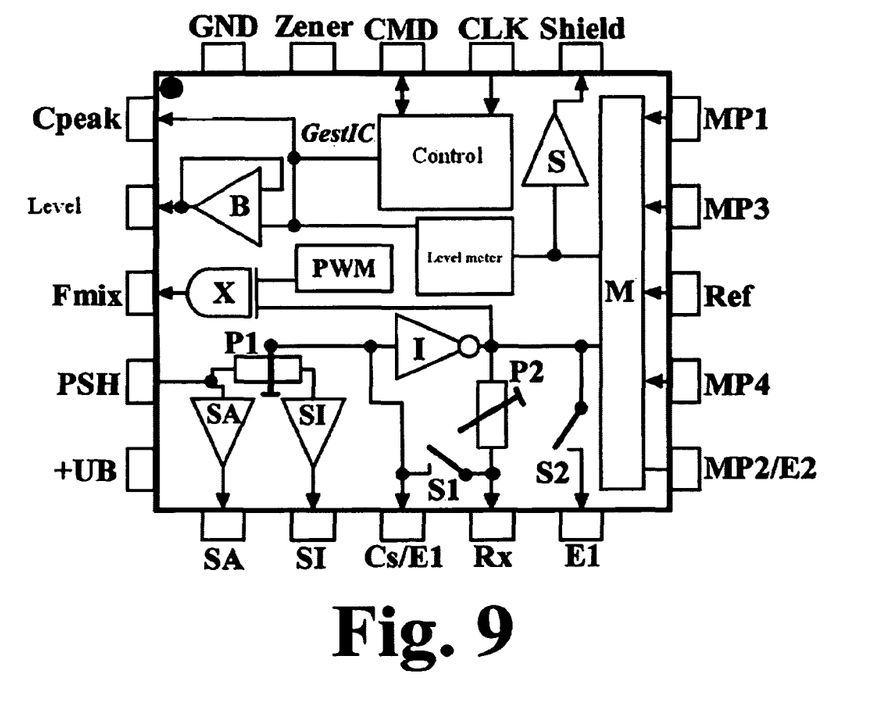
FIG. 9 is a diagram illustrating the installation of a circuit according to the invention in an ASIC.

The sensor electronics for SD and the level measurement can be accommodated in an integrated module (e.g. ASIC) (FIG. 9 or be imprinted in the form of polymer electronics, e.g. directly on the sensor foil according to the invention.

The invention claimed is:

1. A detection system comprising:
a modulator for generating an alternating voltage;
a field-forming electrode structure that is coupled with an output of the modulator for the purpose of generating a spatially extended excitation field;
a detector having a detection electrode structure to detect a field-electrical effect within a detection area extending along the detection electrode structure;
a first shield electrode arranged in proximity to said field forming , electrode structure;
a second shield electrode arranged in proximity to said detection electrode structure;
wherein said first and second shield electrodes are coupled with said output of the modulator and wherein a signal fed to said second shield electrode is configured to be attenuated with respect to a signal fed to said first shield electrode;
wherein the field-forming structure and the detection electrode structure are provided near each other, and the detection electrode structure and field-forming structure are shielded by said first and second shield electrode from each other such that when the excitation field and the detection area are bridged by an object to be detected, a voltage event that can be classified as indicating a presence is induced in the detection electrode structure.

2. The detection system according to claim 1, wherein the field-forming electrode structure and the detection electrode structure are provided in the closing gap area of a trunk lid.

3. The detection system according to claim 1 wherein the field-forming electrode structure and the detection electrode structure are incorporated in a seal.

4. The detection system according to claim 1 wherein the field-forming electrode structure and the detection electrode structure are made of a conductive synthetic material.

5. The detection system according to claim 1 wherein the shielding structure is connected to the modulator in such a way that a voltage is able to be applied that is modulated in terms of the phase position and voltage level relative to the detection electrode structure and/or the field-forming structure.

6. The detection system according to claim 1 wherein the spatial form of the detection area and/or of the excitation field is shaped or varied through different voltage levels applied to these electrode systems.

7. The detection system according to claim 1 further comprising a plurality of detection electrodes connected with a multiplexer.

8. A trunk-lid assembly for a motor vehicle, comprising a trunk lid movable within a trunk-lid track region, a movement mechanism to guide the trunk lid in that trunk-lid track region, and a detection system according to claim 1, wherein given a state of presence of an object that is detected by the detection system and classified as hazard-relevant, the movement mechanism is placed in an operational state in which the risk of injury from the motion of the trunk lid is prevented or reduced.

9. A system for detecting the approach of vital objects toward moved components that are movable as such within a control range, comprising:
 a transmission electrode structure for transmitting a spatially extended excitation field,
 a LC network connected to the transmission electrode,
 a first oscillator and a reference oscillator;
 a mixer coupled with the reference oscillator;
 a first switch for coupling the first oscillator with the LC network or with the mixer;
 a receiving electrode structure to receive a field-electrical effect within a receiving area extending along the receiving electrode structure which is configured to be coupled with the first oscillator to determine the frequency of the first oscillator;
 first and second shield electrodes coupled with the LC network; and
 an evaluation circuit coupled with an output of the mixer for evaluating the operation of first oscillator and for generating an evaluation result based thereon;
 wherein the transmission electrode structure and the a receiving electrode structure are provided near each other, and the receiving electrode structure and the transmission electrode structure are shielded by said first and second shield electrode from each other such that when the excitation field and the receiving area are bridged by an object to be detected, a voltage event that can be classified as indicating a presence is induced in the receiving electrode structure.

10. The system according to claim 9 wherein the evaluation circuit comprises a low pass filter.

11. The system according to claim 10 wherein the receiving electrode is coupled with said LC network through a potentiometer.

12. The system according to claim 9, wherein a signal fed to said second shield electrode is attenuated with respect to a signal fed to the first shield electrode.

13. The system according to claim 9, wherein the first oscillator and the reference oscillator oscillate with the same frequency if no object is near the receiving electrode.

14. The system according to claim 9, wherein the LC network operates as a level shifter.

15. The system according to claim 9, further comprising first and second buffers coupled between the LC network and the first and second shield electrode, respectively.

16. The system according to claim 15, wherein the first and second buffers are configurable buffers.

17. The system according to claim 11, wherein the potentiometer is a digital potentiometer.

* * * * *

UNITED STATES PATENT AND TRADEMARK OFFICE
CERTIFICATE OF CORRECTION

PATENT NO. : 8,558,558 B2
APPLICATION NO. : 12/160815
DATED : October 15, 2013
INVENTOR(S) : Wolfgang Richter Page 1 of 1

It is certified that error appears in the above-identified patent and that said Letters Patent is hereby corrected as shown below:

Column 8
In the Claims, Claim 1, line 47 "...are shielded by said first and second shield electrode..." Change to
-- "...ARE LARGELY SHIELDED BY SAID FIRST AND SECOND SHIELD ELECTRODE..." --

Signed and Sealed this
Tenth Day of December, 2013

Margaret A. Focarino
*Commissioner for Patents of the United States Patent and Trademark Office*